Patented Jan. 22, 1935

1,988,475

UNITED STATES PATENT OFFICE 1,988,475

CORN GLUTEN PLASTIC AND METHOD OF MAKING SAME

Henry Berlin, New York, N. Y., assignor, by mesne assignments, to Resinox Corporation, New York, N. Y., a corporation of Delaware No Drawing. Application February 20, 1931, Serial No. 517,319

1 Claim. (Cl. 106—22)

This invention relates to the utilization of a purified form of corn gluten for the production of dense, hard, horn-like substances. While the physical properties of the substances produced may vary in accordance with regulated variations (within the scope of my invention) in the process of manufacture, the products in respect to their general physical characteristics are similar to and may be said to be intermediate casein plastics and synthetic resins of the phenol-formaldehyde type (bakelite). They are stronger and more heat resistant than casein plastics and can be made to take colors better than bakelite. They are substantially as hard but are less brittle and somewhat more flexible than bakelite and can be more successfully machine or sculptured.

The corn gluten used preferably comprises a purified mixture containing both the alcohol soluble portion and the alcohol insoluble portion, although these materials may be employed separately. It should be substantially free of fats, which cause blistering in the molds, and of starch which tends to make the product brittle and non-resistant to water. To obtain gluten of the required purity, crude corn gluten from the gluten settlers may be treated in accordance with any of the methods disclosed in the co-pending U. S. application of Henry Berlin, filed July 19, 1929, Serial No. 379,563, now U. S. Patent 1,888,785. For example, according to one procedure disclosed in this patent, crude gluten is treated with cresol to obtain a purified material which may subsequently be separated into its component parts, prolamin and glutelin. The purified mixture, consisting principally of prolamin and glutelin, is particularly adapted for use in the present process.

In addition to gluten the process involves the use of (1) a phenolic substance, one or several higher alcohols and small amounts of formaldehyde or polymers thereof, or condensates capable of liberating formaldehyde; or (2) a heterocyclic aldehyde such as furfural and an aromatic ester such as di- or mono-ethylphthalate; or (3) the substances mentioned under (1) together with those specified under (2).

The ingredients are mixed, with or without water added as a diluent (which, if added, must be removed by drying before molding) and this mixture is molded in molds, such as are used for bakelite or phenol carbohydrate resins or shellac resins, with application of heat and pressure. The molded articles are dense and hard but they may be further hardened and made water resistant by baking in an oven at 100° C. for 24 hours or, by (4) being kept in an aqueous solution of formaldehyde for a suitable length of time which may vary from twelve hours or less to several weeks, and then dried. Or the articles made under (1), (2) or (3) may be (5) immersed in a bath of casein, sodium hydroxide and formaline for periods of time from about twelve hours to several weeks; the period of treatment under (4) or (5) varying in accordance with the size and also the shape or surface contour of the article.

Finally, articles made as above may be dyed (6) with mineral dyes which are added to the batches of processes (1), (2) or (3); or (7) with organic dyes in which case the articles made under processes (1) to (5)—but without drying if made under (4) or (5)—are first immersed in a lead acetate bath and then in an acid bath, hydrochloric acid, for example. The lead acetate will penetrate the plastic substance to some extent and will react with the hydrochloric acid to precipitate lead chloride, which is a substance white in color. This provides a surface film that will combine with the organic dye to give a lake.

In this method (7) either natural or synthetic organic dyes may be employed. The process may also be used for dyeing other plastics such as those of the casein type.

Specific procedures in accordance with this invention are given in the following examples:

Example (1)

100 parts by weight of finely powdered, starch and fat free corn gluten (both soluble and insoluble in alcohol) or of the soluble portion (prolamin) or of the insoluble portion (glutelin), are thoroughly mixed, cold, with 8 parts of carbolic acid, 3 of butanol, 2.5 parts of glycerine, 3 parts of hexamethylenetetramine, 2.5 parts paraformaldehyde and 5 parts of water, and the mixture molded at 300° F. and 3000 pounds pressure for nine minutes. The higher alcohols, butanol and glycerine, can be used alternatively but are preferably both employed. The glycerine will be found to remain in the product to some extent and therefore to increase its plasticity. The butanol is a wetting agent primarily and to a large extent evaporates. Higher alcohols are used in preference to lower alcohols because of their higher boiling points in view of the temperatures of the molding or curing operation. Other higher alcohols could be used such as di-acetone alcohol. The alcohols are primarily used to give penetration and facilitate the plasticizing or condensing action of the gluten and phenolic substance.

Other phenolic substances such as cresol can be used. The function of the formaldehyde is to harden the condensed gluten and phenol. Formaldehyde could be used in place of the specified hexamethylenetetramine and paraformaldehyde except that as a gas or in its liquid solution (formaline) it is difficult to handle. Preferably both hexamethylenetetramine and paraformaldehyde are used because the former decomposes at a higher temperature than the latter, that is, one decomposes too soon at the temperature of molding and the other too late, so that by using both these formaldehyde yielding substances formaldehyde is left in contact with the other ingredients in sufficient amounts, without undue waste, and for a sufficiently long time to insure the necessary hardening action. Water is not essential but facilitates interpenetration in mixing the ingredients of the bath. The temperature should be high enough to decompose the formaldehyde yielding substances but not high enough to char the gluten, approximate range 250° F. to 300° F. The pressure should be as high as possible to insure high density in the molded article.

Example (2)

100 parts of purified gluten (as in Example 1) are mixed with 20 parts furfural and 4 parts of di-ethylphthalate and molded at 300° F. and 3000 pounds pressure for twelve minutes. Monoethylphthalate or any aromatic ester could be used.

Example (3)

The furfural and di-ethylphthalate of Example (2) can be added to the ingredients of Example (1) and the amount of gluten doubled. Molding will be in accordance with Example (1).

Example (4). Hardening and waterproofing

The product of Example (1) or (2) or (3) is put into a 40% aqueous solution of formaldehyde and left for from twelve hours to several weeks depending on the size and shape of the article. The formaldehyde penetrates and combines with substance composing the molded article increasing its hardness and destroying or diminishing its capacity for absorbing water. The longer the treatment, the deeper the penetration. After removal from the bath the article is dried; or

Example (5)

The molded article may be immersed for like periods of time in a bath consisting of 1000 parts by weight of water, 100 parts casein, 1.5 parts of sodium hydroxide and 20 parts of a 40% solution of formaldehyde.

Example (6). Dyeing

When mineral dyes are used they are incorporated into the batches of processes (1), (2) or (3); and when organic dyes are to be used.

Example (7)

The articles of processes (1) to (5)—the drying step being omitted in case the water proofing step of Examples (4) or (5) is employed—are immersed first in a bath consisting of a 10% water solution of lead acetate and then in a bath consisting of a 10% solution of hydrochloric acid, and as soon as the surface is coated with lead chloride the article is taken out of the bath and rinsed with water to remove the acid and put into the dye vat where the dye and lead chloride combine to form a water insoluble lake which adheres to the molded article.

I desire to cover by patent all modifications of the above specific processes within the scope of the appended claim.

I claim:

A heat hardened reaction product of a phenolic substance, an aldehyde-yielding substance, and the residue of corn gluten, after substantially complete removal of its fat and starch content, consisting principally of prolamin and glutelin.

HENRY BERLIN